United States Patent
Du et al.

(10) Patent No.: US 11,650,010 B2
(45) Date of Patent: May 16, 2023

(54) ADSORPTIVE XENON RECOVERY PROCESS FROM A GAS OR LIQUID STREAM AT CRYOGENIC TEMPERATURE

(71) Applicant: PRAXAIR TECHNOLOGY, INC., Danbury, CT (US)

(72) Inventors: Hai Du, Hinsdale, IL (US); Michael J. Dray, Getzville, NY (US); James P. Meagher, Buffalo, NY (US); Steven R. Falta, Honeoye Falls, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 84 days.

(21) Appl. No.: 16/961,402

(22) PCT Filed: Dec. 12, 2018

(86) PCT No.: PCT/US2018/065121
§ 371 (c)(1),
(2) Date: Jul. 10, 2020

(87) PCT Pub. No.: WO2019/139712
PCT Pub. Date: Jul. 18, 2019

(65) Prior Publication Data
US 2020/0378681 A1  Dec. 3, 2020

Related U.S. Application Data

(60) Provisional application No. 62/616,021, filed on Jan. 11, 2018.

(51) Int. Cl.
*F25J 3/04*      (2006.01)
*F25J 3/08*      (2006.01)

(52) U.S. Cl.
CPC ....... *F25J 3/04757* (2013.01); *F25J 3/04751* (2013.01); *F25J 3/08* (2013.01);
(Continued)

(58) Field of Classification Search
CPC ........ F25J 3/04; F25J 3/04571; F25J 3/04745; F25J 2215/36; F25J 2210/50;
(Continued)

(56) References Cited

U.S. PATENT DOCUMENTS 3,922,150 A * 11/1975 Yusa ...................... F25J 3/0285
95/96
3,971,640 A    7/1976 Golovko
(Continued)

FOREIGN PATENT DOCUMENTS

CA    2186976 A1    9/2001
CN    1420079 A    5/2003
(Continued)

*Primary Examiner* — Brian M King
(74) *Attorney, Agent, or Firm* — Ralph J. Mancini

(57) ABSTRACT

The present invention relates to an adsorption process for xenon recovery from a cryogenic liquid or gas stream wherein a bed of adsorbent is contacted with a xenon-containing liquid or gas stream selectively adsorbing the xenon from said stream. The adsorption bed is operated to at least near full breakthrough with xenon to enable a deep rejection of other stream components, prior to regeneration using the temperature swing method. After the stripping step, the xenon adsorbent bed is drained to clear out the liquid residue left in the nonselective void space and the xenon molecules in those void spaces is recycled upstream to the ASU distillation column for increasing xenon recovery. The xenon adsorbent bed is optionally purged with oxygen, followed by purging with gaseous argon at cryogenic temperature ($\leq 160$ K) to displace the oxygen co-adsorbed on the AgX adsorbent due to higher selectivity of argon over oxygen on the AgX adsorbent. By the end of this step, the xenon adsorbent bed is filled with argon and xenon. Then the entire adsorbent bed is heated indirectly without utilizing any of the purge gas for direct heating. Operating the adsorption bed to near full breakthrough with xenon and
(Continued)

displacing the adsorbed oxygen and other residues with argon, prior to regeneration, along with indirect heating of the bed, enables production of a high purity product ≥40 vol % xenon from the adsorption bed and further enables safely heating without any purge gas and ease for downstream product collection, even in cases where hydrocarbons are co-present in the feed stream.

24 Claims, 4 Drawing Sheets

(52) U.S. Cl.
CPC ........ *F25J 2205/68* (2013.01); *F25J 2215/36* (2013.01); *F25J 2220/82* (2013.01)

(58) Field of Classification Search
CPC .. F25J 2205/60; F25J 2205/62; F25J 2205/64; F25J 2205/66; F25J 2205/68; F25J 2205/70; F25J 2205/72; C01B 2210/0037; C01B 2210/0029; C01B 2210/03031; C01B 2210/0032; C01B 2210/0034; C01B 2210/0035; C01B 2210/0036; C01B 2210/004; C01B 2210/0043; C01B 2210/0045; C01B 2210/0078; C01B 2210/0079; C01B 2210/0085; C01B 2210/0084; C01B 2210/007
See application file for complete search history.

(56) References Cited

U.S. PATENT DOCUMENTS

| | | | |
|---|---|---|---|
| 4,874,592 A | | 10/1989 | Shino et al. |
| 5,039,500 A | | 8/1991 | Shino et al. |
| 5,730,783 A | * | 3/1998 | Sanui ................ B01D 53/0462 95/115 |
| 6,379,586 B1 | * | 4/2002 | Zeng .................... C07D 301/22 252/373 |
| 6,658,894 B2 | | 12/2003 | Golden et al. |
| 7,285,154 B2 | * | 10/2007 | Karwacki, Jr. ..... C01B 23/0052 95/96 |
| 2003/0106335 A1 | * | 6/2003 | Golden ................. B01D 53/04 62/648 |
| 2006/0107831 A1 | | 5/2006 | Karwacki Jr. et al. |
| 2009/0288557 A1 | * | 11/2009 | Carati .................... B01J 20/186 95/103 |
| 2013/0019749 A1 | * | 1/2013 | Hufton .................. B01D 53/02 95/148 |
| 2018/0058758 A1 | * | 3/2018 | Barrett ................ B01J 20/3092 |
| 2019/0336938 A1 | * | 11/2019 | Hirano ................... B01J 29/743 |

FOREIGN PATENT DOCUMENTS

| | | |
|---|---|---|
| DE | 2309447 A1 | 9/1973 |
| EP | 1316357 A1 | 6/2003 |
| WO | 2018038793 A1 | 3/2018 |

\* cited by examiner

ADSORPTIVE XENON RECOVERY PROCESS FROM A GAS OR LIQUID STREAM AT CRYOGENIC TEMPERATURE

RELATED APPLICATIONS

This application claims the benefit of International Application No. PCT/US2018/065121, filed on Dec. 12, 2018 which claimed the benefit of U.S. Provisional Application Ser. No. 62/616,021, filed on Jan. 11, 2018, which are incorporated herein by reference.

FIELD OF THE INVENTION

The present invention relates to an adsorption process for xenon recovery from a cryogenic liquid or gas stream wherein a bed of adsorbent is contacted with the aforementioned xenon containing liquid or gas stream and adsorbs the xenon selectively from this fluid stream. The aforementioned adsorbed xenon is then recovered and collected as product at enriched concentration above aforementioned cryogenic liquid or gas feed.

BACKGROUND OF THE INVENTION

U.S. Pat. No. 5,039,500 by Shino et al, discloses a process for producing high purity xenon with liquid oxygen from a main condenser of an air separation unit. In the process of Shino et al, the liquid oxygen stream, containing xenon, krypton and hydrocarbons is first vaporized before being contacted with an adsorbent at a preselected temperature and pressure so as to adsorb on the adsorbent xenon, but not oxygen, krypton or hydrocarbons contained in the oxygen stream. The adsorbent is regenerated using a purge gas and by heating. The basic adsorption process can be augmented by other unit operations to increase the purity of the xenon, including a solid-gas separating column, a catalyst column, a moisture and carbon dioxide removal column and so on. A disadvantage of this process is that the liquid feed stream from the cryogenic plant must be converted to a gas stream prior to being contacted with the adsorbent bed. Moreover from claim 1, the adsorption process must be operated under preselected temperature and pressure conditions such that xenon is adsorbed and the krypton, hydrocarbon and oxygen are not. This places limitations on the operating conditions for the process. From embodiment 1 (column 3, lines 20-48) however, it appears this approach of identifying pressure and temperature conditions, where xenon is adsorbed and oxygen, krypton and hydrocarbons are not, was only partially successful. In this embodiment, a silica gel adsorbent was contacted until xenon breakthrough was achieved with a gasified stream at −170° C. containing 31 ppm xenon, 70 ppm krypton and 38 ppm methane and low concentrations of other hydrocarbons in an oxygen matrix. After the gas was heated to 120° C. to regenerate the adsorbent, the effluent concentrations became 1.4% xenon, 0.14% krypton, 0.066% hydrocarbon and balance oxygen. The fact that the krypton, and hydrocarbons have become significantly enriched beyond their feed concentration, in the same way as the xenon, suggests that these components were also adsorbed under the conditions used for the adsorption feed step, in an apparent contradiction with the process as claimed. It is likely therefore that due to this co-adsorption of other components, especially the hydrocarbon components and their enrichment by adsorption, that later embodiments employ a catalyst column to remove these hydrocarbons and a carbon dioxide and moisture removal column thereafter, to remove the products of hydrocarbon combustion over the catalyst. By contrast, in the adsorption process of the present invention, the feed stream can be liquid or gas phase and during the purging and heating steps, employed to recover the xenon product, the concentration of krypton and hydrocarbons is much less than their concentrations in the feed. In the art of Shino et al, as clarified in embodiment 1, 38 ppm methane and low concentrations of other hydrocarbons in the feed, became 0.066% or 660 ppm during the heating step used to regenerate the adsorbent bed. This is an enrichment of approximately 17 times the concentration of hydrocarbons in the feed.

In U.S. Pat. No. 4,874,592 also by Shino et al, an adsorption-desorption process is described, wherein xenon is concentrated from a vented liquid oxygen stream by successive stages of adsorption and desorption and wherein the hydrocarbons are removed catalytically from the xenon gas stream recovered after the first adsorption stage. From inventive examples 1 and 2 and as shown in FIGS. 1 and 2, the vented rare gas containing stream from a rectifying column, is introduced into a first adsorption column, where a silica gel adsorbent, capable of selectively adsorbing the xenon is allowed to saturate. The product stream from this first adsorption column is collected by reducing the pressure and by heating the column. The product stream contained a mixture of xenon, krypton and hydrocarbons in enriched concentrations above the feed composition. A catalyst unit operation and subsequent carbon dioxide and water removal column were used for hydrocarbon removal, prior to a second adsorption column, employed to increase the purity of the rare gas products still further. As clarified in Example 1 of this patent, venting the liquid oxygen stream generates a gaseous oxygen feed stream to the adsorption system. The adsorption process of the present invention is compatible with either a liquid or a gas feed or combination of them and therefore the step of venting the liquid oxygen is not required. Moreover, the present process is operated such that enrichment of the hydrocarbons beyond their concentration in the feed stream is avoided, and therefore a step of catalytic oxidation, as described in this art is not required.

In U.S. Pat. No. 6,658,894 to Golden et al, a process of recovering at least one of xenon or krypton from and oxygen-containing gas stream by selectively adsorbing the xenon and/or krypton using a zeolite of type X exchanged with Li and Ag. According to Example 7, which showcases the key steps in the process of Golden et al, a liquid oxygen stream containing 17 ppm xenon, 95 ppm methane, and 10 ppm nitrous oxide was passed through a silica gel bed wherein the nitrous oxide was removed. The nitrous oxide free effluent was vaporized to 113 K and a portion of this gas stream was sent to a bed containing the type X zeolite exchanged with lithium and silver. The breakthrough of methane was detected after 190 minutes on stream, whereas after 1400 minutes on stream, no breakthrough of xenon had occurred. At this point, the feed step was stopped and regeneration was started using a nitrogen purge gas at 113 K. From the data in FIG. 4 of Golden et al, the methane concentration during desorption increased to a maximum of between 8000-9000 ppm. The xenon product was collected by further warming the adsorption bed. Key features of the art of Golden et al are:

Use of the type X zeolite exchanged with both Li and Ag.
Operation of the adsorption process to the point where breakthrough of xenon was not observed.

Desorption under nitrogen, wherein the methane concentration at the outlet significantly exceeds the methane concentration in the feed stream (95 ppm versus 8000 to 9000 ppm).

In the process of the present invention, the methane levels during desorption do not show this enrichment behavior as exhibited in the data presented in Golden et al. Moreover, the present process can be operated in a liquid phase and a Li and Ag type X zeolite is not required.

In U.S. Pat. No. 3,971,640 to Golovko an adsorption process for recovering a krypton-xenon concentrate from an air stream is described. In the process of Golovko a gaseous air stream at 90-110K containing admixtures of krypton, xenon and hydrocarbons is passed through an adsorbent having pore-openings from 5-150 Å, during which time the krypton, xenon, nitrogen, oxygen and hydrocarbons are adsorbed. The feed step is ended when krypton is detected at the outlet of the adsorber. At this point, a staged temperature desorption wherein the temperature is raised firstly from 90-110 K to 250-280 K wherein xenon, krypton, oxygen, nitrogen and hydrocarbons are desorbed from the adsorbent and thereafter the bed is heated further from 250-280 K to 500-650 K with the desorbed products at this point discarded to atmosphere. Unlike the process of Golovko et al, during the desorption step of the present process, substantially only xenon and oxygen are desorbed with any additional components, such as hydrocarbons, are desorbed at concentrations significantly less than their concentration in the feed stream. From example 2 in Golovko, hydrocarbon levels of 2% were measured during desorption which again suggests significant adsorption and concentration of these hydrocarbons by adsorption which does not take place in our process. Moreover in the present process, the use of staged desorption temperatures up to 500-650 K is also avoided.

As will be described in the following description, maintaining the adsorption bed on feed until the xenon concentration at the outlet of the bed is greater than or equal to 90% of the inlet concentration, enables the eliminations of other impurities concentrating in the adsorbent bed especially hydrocarbons. Purging and displacing the adsorbent bed with argon or desorbed xenon product or pure xenon product eliminates oxygen from the adsorbent bed and enables ease and safe heating of the adsorbent vessel during the heating and regeneration step, as well as product collecting and/or downstream processing in this temperature swing adsorption process. Moreover in this way, the bed can be operated under pressure and temperature conditions where other gases can be co-fed. This serves to extend the range of process conditions useable for the inventive process, versus those of the prior art.

SUMMARY OF THE INVENTION

The present invention relates to an adsorption process for xenon recovery from a cryogenic liquid or gas stream wherein a bed of adsorbent is contacted with a xenon-containing liquid or gas stream selectively adsorbing the xenon from said stream. The adsorption bed is operated to at least near full breakthrough with xenon to enable a deep rejection of other stream components, prior to regeneration using the temperature swing method. After the stripping step, the xenon adsorbent bed is drained to clear out the liquid residue left in the nonselective void space and the xenon molecules in those void spaces is recycled upstream to the ASU distillation column for increasing xenon recovery. The xenon adsorbent bed is then purged with gaseous argon at cryogenic temperature (for example ≤150 K, in another embodiment ≤120 K) to displace the oxygen co-adsorbed on the AgX adsorbent due to higher selectivity of argon over oxygen on the AgX adsorbent. By the end of this step, the xenon adsorbent bed is filled with argon and xenon. Then the entire adsorbent bed is heated indirectly without utilizing any of the purge gas for direct heating. At the end of the indirect heating step, a purge sweep is used to sweep out xenon left in the vessel void space as well as holding on the adsorbent surface to increase the xenon recovery. Any gas other than xenon can be used as the purge gas, which can be employed at ambient temperature, or it can be heated. In one embodiment, argon is used as the purge gas. Helium, krypton, oxygen, nitrogen and dry air can also be used as purge gases. Operating the adsorption bed to near full breakthrough with xenon and displacing the adsorbed oxygen and other residues with argon, prior to regeneration, along with indirect heating of the bed and small purge gas sweep, in one embodiment an argon sweep, at the end of indirect heating, enables recovery/production of a high purity xenon product, typically ≥10 vol % xenon, in another embodiment ≥40 vol % xenon from the adsorption bed. The xenon loss from this process is minimized through integrating the adsorptive process with the upstream cryogenic liquid or gas source, so the xenon escaped from this process is recycled back to save the xenon molecules. Therefore, high xenon recovery from this process is achieved. The recovery of this process is defined as the ratio of final xenon mass in the product over the xenon mass from the crude feed. In one embodiment, ≥40% xenon recovery is obtained, in another embodiment ≥70% is achieved. High recovery further enables safely heating without any purge gas and ease for downstream product collection, even in cases where hydrocarbons are co-present in the feed stream.

DETAILED DESCRIPTION OF THE FIGURES

DETAILED DESCRIPTION OF THE INVENTION

Figure 1:
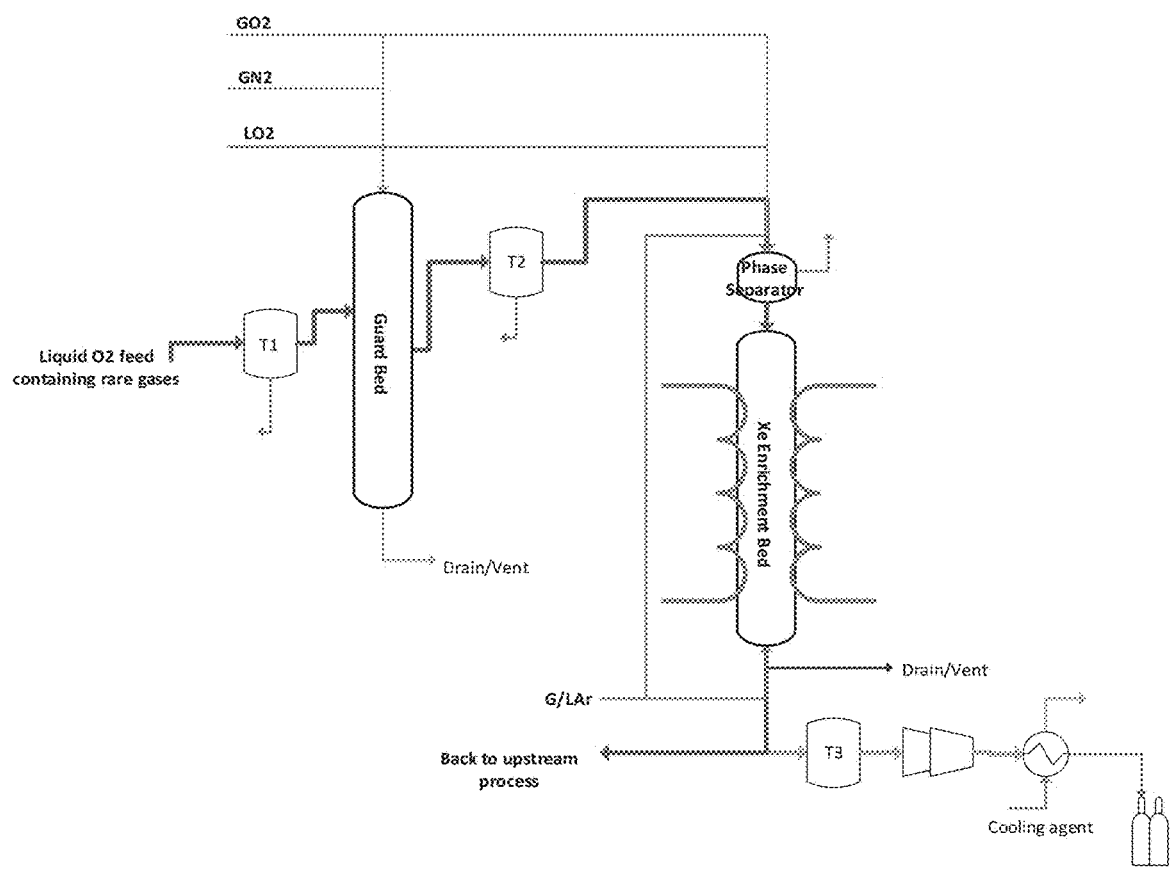
FIG. 1 depicts a block flow diagram for adsorptive xenon enrichment process with downstream product collecting and packaging.
Figure 2:
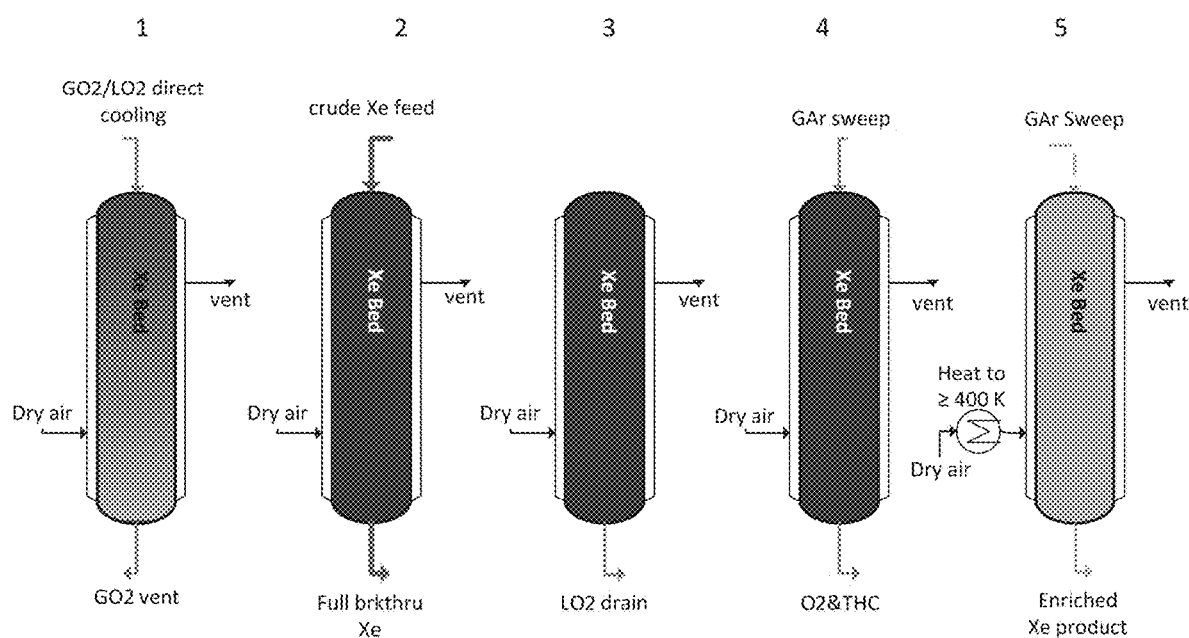
FIG. 2 is a schematic illustrating process steps for 1-bed adsorption process.
Figure 3:
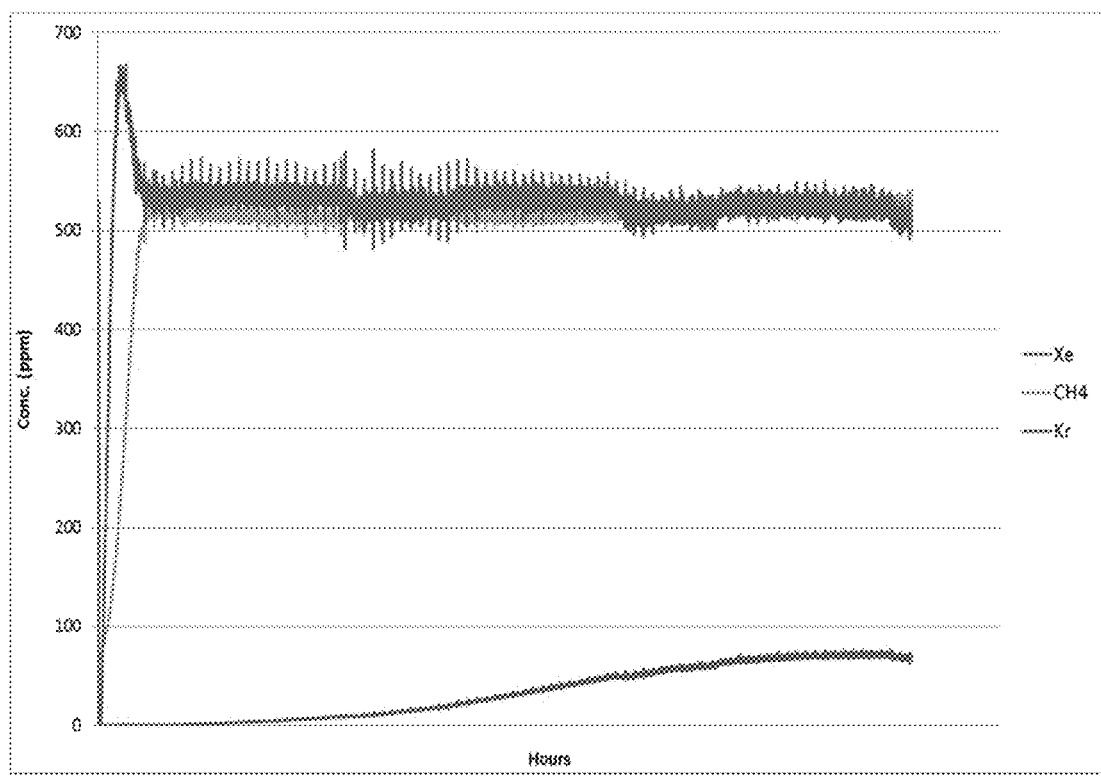
FIG. 3 shows the concentration profiles for Kr, Xe and $CH_4$ during adsorption on AgLSX.

The invention relates to a cost-effective adsorption process and apparatus for xenon recovery from a cryogenic fluid stream which can be operated under conditions wherein xenon can be enriched from trace level to high concentration or even to pure xenon products with high recovery.

The method of the invention has several advantages compared to known methods. First, when using the purge gas to directly purge the xenon adsorbent bed, the desorbed xenon from the AgX adsorbent is diluted and xenon concentration is low. Through calculation of the amount hot purge gas required to bring the adsorbent bed temperature to desired regeneration temperature, the xenon released from adsorbent will be diluted significantly around 1%. This requires further downstream separation work to enrich xenon from the purge gas, which means extra operational and capital expense. The method of the invention utilizes indirect heating to increase the adsorbent bed to elevated temperatures to release xenon from the adsorbent bed. Once the adsorbent bed reaches target temperatures, a controlled gentle sweep is used to increase the xenon recovery at the end of the indirect heating step. This small purge helps to further desorb strongly held xenon from the adsorbent bed and sweep out xenon molecules left in the vessel void space without diluting the overall released xenon product from the adsorbent bed.

Second, the claimed method avoids using heated oxygen (up to 450 K) as the hot purge gas, which eliminates the need of a special adsorbent vessel as well as special piping to allow the hot oxygen being used for this purpose. This reduces complexity and cost of the system design.

In accordance with the invention,

1. An adsorbent bed packed with xenon selective adsorbent materials at cryogenic temperature, having an inlet and an outlet, is contacted with oxygen containing rare gases fluid or gas feed stream comprising xenon and at least one other adsorbable component, such as krypton and/or methane.

2. The adsorbent bed is maintained on feed until the xenon concentration at the outlet of the bed is greater than or equal to 90% of the xenon concentration at the inlet of the bed. The reason for maintaining the adsorbent bed on feed until the concentration levels of xenon at the outlet of the bed is above certain concentration levels is to achieve deep rejection of all unwanted components especially hydrocarbons from the bed. More particularly, as xenon adsorbs more strongly on the adsorbent than light hydrocarbons commonly present in cryogenic rare gas streams, maintaining the bed on feed until the xenon concentration at the outlet of the bed is greater than or equal to 90% of the xenon concentration at the inlet of the bed forces any hydrocarbons adsorbed on the adsorbent to be replaced by xenon and thereby achieves deep rejection of hydrocarbons from the bed. Examples of such hydrocarbons include, but is not limited to methane, ethane, propane, ethylene and combinations thereof. For obvious safety reasons it is detrimental to enrich oxygen based fluid feed streams with greater than nominal concentrations of $C_1$-$C_3$ hydrocarbons which can occur in the adsorbent bed should the outlet concentration criterion be unmet.

3. At the end of feed step, the bed is drained any crude feed left from the non-selective voids (e.g., xenon and hydrocarbon) is recycled. Optionally, liquid oxygen (or gas oxygen) is introduced to purge any remaining hydrocarbon left in the system. Using oxygen in this fashion accomplishes the same function as an argon purge, but is cheaper than argon. The cold argon purge in the following step effectively displaces any oxygen coadsorbed on the adsorbent.

4. The adsorbent bed is then purged using a cold argon purge gas which is substantially free of xenon and the at least one other adsorbable component. The function of cold argon gas purge is twofold. One is to remove hydrocarbons and liquid residues from the non-selective void spaces in the bed. The other is to displace any co-adsorbed oxygen from the adsorbent bed. Other purge gases can also be employed, helium in one embodiment, krypton in another. A combination of purges can also be utilized. At the end of this step, the adsorbent is loaded with xenon and argon. This step is operated below 150° K and preferably below 120° K to ensure xenon is not desorbing from the adsorbent.

5. Then the entire adsorbent bed is heated directly either with a xenon purge gas or with an embedded heating device or external indirect heating through the adsorbent vessel wall such as with heated gas, induction heating or heating tape. The energy required for the internal heating method could be a recirculation of gas product heat integrated with downstream processing unit. In order to increase the system xenon recovery, at the end of this heating step, once the xenon bed temperature reaches ≥400 K, preferably ≥500K, a controlled gentle purge gas, preferably argon, is used to sweep out xenon strongly held on the adsorbent as well as left in the void space of the vessel. Any gas other than xenon can also be used to purge the bed. Non-limiting examples of purge gases include helium, krypton, oxygen, nitrogen, dry air and the like, or a combination of two or more of said purge gases.

6. Due to negligible oxygen existence in adsorbent bed after argon displacement and before high temperature regeneration, no specifically designed adsorbent vessel is required and the desorbed xenon contained gas can be easily and safely collected for downstream processing. The overall adsorptive xenon system/operating cost is significantly reduced due to improvement in xenon purity and recovery rates, which also minimizes downstream processing.

7. The adsorption bed is then cooled indirectly to ambient temperature and then directly cooled to cryogenic temperatures with either oxygen containing rare gases fluid feed stream or oxygen containing fluid or argon containing fluid or nitrogen containing fluid or mixture of the above, or cryogenic air stream, which is substantially free of moisture and carbon dioxide or other contaminants.

8. Steps 1-7 are repeated in a cyclic manner.

It is essential that heated purge gas other than xenon gas not be used to heat the adsorbent bed, since it dilutes the desorbed xenon product concentration. The final controlled purge is used at the end of the heating once the xenon bed reaches desired desorption temperature to only increase xenon recovery. Heating the bed in the method of the invention can be performed in one of three preferred heating methods.

1. Heating the bed directly with an embedded heating device inside the adsorbent bed. This should be the most energy efficient way as heat is provided directly to warm up the adsorbent. However, inserting heating device inside adsorbent bed may adversely impact the flow distribution of the stream inside the adsorbent bed (especially for liquid feed stream), it may increase the complexity of vessel design; reliability and maintenance are also concerns for normal operation.

2. Heating the bed by applying heated product xenon to purge the adsorbent bed for regeneration. This method can be applied once xenon product is produced and potentially further enriching xenon to above 90% concentration. Downstream packaging system with compressor can be integrated with the adsorbent bed to circulate the xenon product for this purpose.

3. Heating the bed indirectly through the adsorbent vessel wall by using heated gas through jacket of the adsorbent bed or induction heating or heating tape for regeneration. This is a relatively easy method from vessel design, operation reliability and maintenance standpoint.

The method of the present invention provides an improved and economical method for regenerating xenon adsorbent beds resulting in high concentrations, free of impurities, of xenon product (≥40%) and high xenon recovery rates (≥40%)

1. Xe purity—Xe content released during the regeneration of the Xe bed is of higher purity and the higher the purity, given the fixed amount of Xe released, the less the volume of final product in the cylinders. High purity Xe minimizes downstream refining costs and high concentration Xe cylinders can be shipped to end customer minimizing shipping costs. The method of the invention generally averages >10 vol % of Xe in the cylinders, in another embodiment >20 vol %, in another embodiment >30 vol % and in yet another embodiment >40 vol %. (Xe content*volume is the Xe mass adsorbed in the Xe bed, ultimately determined by how much Xe was adsorbed on the Xe bed in the feed step).

2. Xe recovery—is the ratio of Xe recovered (total Xe mass) over the Xe concentration in the crude feed. The method of the invention allows >75% Xe "recovery". 40% Xe recovery is generally considered the cost even basis line.

Maintaining the adsorption bed on feed until the Xe concentration at the outlet of the bed is greater than or equal to 90% of the inlet concentration, enables the eliminations of other impurities concentrating in the adsorbent bed, especially hydrocarbons, enables high xenon enrichment on the adsorbent bed and ensures high xenon concentration (and negligible impurities) in product when it is released during regeneration. Purging and displacing the adsorbent bed with argon eliminates any impurities residue left and oxygen from the adsorbent bed and enables easy and safe indirect heating of the adsorbent vessel during the heating and regeneration step, as well as product collecting and/or downstream processing in this temperature swing adsorption process. The final gas sweeping with non-xenon contained gas enhances xenon release from the adsorbent bed and increases xenon recovery from the process. This also allows the bed to be operated under pressure and temperature conditions where other gases can be co-fed. This serves to extend the range of process conditions useable for the inventive process, versus those of the prior art. Operated as the disclosed method here, the released product of xenon and argon mixture can be processed easily in the final refinery for pure xenon production, and a hydrocarbon removal system is eliminated.

The process of the invention can be operated utilizing 1 or more adsorption beds and can be used in conjunction with other adsorbents and/or processes which can help simplify the feed stream to the xenon recovery adsorbent material, such as a gel trap or a guard bed. A preferred adsorbent for the inventive processes is a silver ion exchanged zeolite of type X, wherein the ion exchange level is at least 80% Ag on an equivalents basis, in another embodiment at least 90% on an equivalents basis.

The prior art details temperature swing adsorption processes for recovering xenon from a cryogenic liquid using AgX as the adsorbent. During the regeneration step of such processes, the bed temperature is raised to a temperature of 400 K or higher to desorb and collect xenon. Subsequently, the bed temperature is then lowered back to cryogenic temperature. To minimize the equipment cost associated with a buffer tank, which stores feed flow during the regeneration and cool down steps, the regeneration time needs be limited. This invention describes a method for rapidly heating the adsorbent bed through vessel design and indirect heating.

Regeneration of the adsorbent bed in the method of the invention is accomplished through one of the three preferred heating methods of the invention. In one embodiment, indirect heating is employed. Adsorbents such as AgX have a low thermal conductivity, which limits rate at which heat can be transferred into the bed. As a result, to achieve a fast temperature rise with heated walls, the vessel diameter needs to be small and or the walls heated to a high temperature. At odds with this is the xenon loading capacity on the adsorbent, which requires a minimal vessel diameter and the maximum allowable temperature the adsorbent can reach. In addition the maximum temperature the vessel and bed reach will impact the cool-down time and amount of fluid needed directly cool the bed and vessel back down to cryogenic temperature. Therefore the problem is to provide a vessel design and indirect heating method which rapidly raises the entire bed above the regeneration temperature while keeping the adsorbent below a maximum allowable adsorbent temperature and limiting the temperature prior to entering the cool-down step.

The minimal diameter of the adsorbent vessel is fixed by the adsorptive mass transfer limitation and the bed length is determined by the quantity of adsorbent needed to adsorb xenon over the adsorption step. To regenerate the bed, the walls can be heated though various methods such as electrical heaters, infrared heating, or convective heating. The latter is the preferred approach for this application due to reliability, cost, and process flexibility. In one vessel design embodiment, this is achieved by adding an outer jacket which extends past the length of the bed. Into the jacket a hot gas is uniformly distributed around the perimeter of the vessel where it heats the vessel walls which indirectly heats the adsorbent bed. It is important to note that the jacket extends past the bed to mitigate heat loss through the ends of the vessel which would impede heating the ends of the bed. Also, it is recognized that other jacket configurations can be used (e.g. spiral tubes, multiple flow paths) in addition to the present concept.

In one embodiment, a three-stage heating method is employed to achieve optimum regeneration:

1) Rapid heating stage—The heated gas enters the jacket at 623K (below maximum the adsorbent temperature) to rapidly heat the outer vessel and the outer regions of the bed. This continues until the portion of the bed closest to the jacket inlet is within a certain margin of the bed regeneration temperature (>473K). The length of this stage can be a fixed time or based on a temperature feedback measurement.

2) Shell Cool-down—After the rapid heating, the gas jacket temperature is lowered to approximately 473K, which cools the outer shell and the outer bed to cool-down temperature. This keeps the outer portion of the bed at the regeneration temperature but reduces the thermal capacity of the bed and vessel prior to any cool-down or purge. At the same time the outer bed is cooling the inner bed, temperature will continue to rise as inner bed receives heat from the outer and warmer parts of the bed. This continues until the bed temperature at near the jacket outlet reaches the regeneration temperature. Also metal temperatures will fall into a safe region to allow use of an oxygen purge if it is used for xenon collection.

3) Cool-down Collection—During this stage the jacket gas is no longer heated and will continue to flow through the outer jacket to begin cooling the vessel and outer portion of the adsorbent and to prevent any ambient contaminants condensation during the inner bed cooling step. The gas flow can be increased to increase the rate of cooling or just maintaining positive pressure during the cooling step.

During the xenon bed regeneration, xenon adsorbed on the adsorbent will be released as soon as temperature of the adsorbent bed rises above 120K, preferably above 150K. The released xenon and the co-desorbed argon gas will build up the pressure inside the inner adsorbent bed, which will proved a driving force for the desorbed gas stream to come out from the inner adsorbent bed. This desorbed xenon mixture (with argon) will be collected downstream in a carefully sized buffer tank to stabilize the flow and concentration of the released product. Then this mixture will be transferred either to downstream packaging process or refinery process to produce pure xenon product. Alternatively, an onsite xenon-argon separation system could be built to produce pure xenon onsite. This system could be a distillation or adsorptive or membrane or others or combinations of those. As most of the xenon is released from the inner adsorbent bed at the end of the heating step, the inner bed will be filled with xenon-argon gas, a final argon purge could be applied to sweep out the xenon molecules out from the inner bed to maximize the xenon recovery.

The adsorption process disclosed herein recovers xenon primarily from a fluid stream (liquid or gas phase), producing a product with no hydrocarbons or hydrocarbons below their concentration in the feed stream. In fact, when operated in a preferred manner, the hydrocarbon content in the xenon product stream is reduced to less than or equal to 50 ppm, in another embodiment less than or equal to 1 ppm, from a feed containing up to 8000 ppm. By virtue of the deep hydrocarbon rejection achieved by the present invention, complicated desorption protocols like that of Golovko, or the use of inert purge gases such as nitrogen according to Golden et al and/or the addition of other unit operations, such as catalytic hydrocarbon removal as described by Shino et al is avoided. Furthermore, ability of the process of the invention to process cryogenic liquid oxygen containing feed streams avoids the need for vaporization, which when hydrocarbons are present, can pose safety concerns from their concentration in the oxygen fluid during vaporization.

The released xenon product from the process of the invention is at least 40 vol % and could reach as high as more than 90 vol % balanced with argon which significantly reduces the separation work needed in the downstream pure xenon production process. A method and apparatus is disclosed to collect the released xenon and package to offsite locations for final refinery. Also applying argon gas to displace oxygen from the adsorbent enables a risk free heating method of the adsorbent vessel without any purge gas requirement, which leads to lower energy requirement and shorter heating step time as well as highly enriched xenon product released in the desorption step. Argon gas as the purge is also helpful downstream in the final distillation system for producing pure xenon, which avoids cold temperature when other purge gas is used, such as nitrogen U.S. Pat. No. 6,658,894 by Golden et al. to reduce condenser duty.

One economic advantage of the invention stems from the simplicity of the process and therefore the need for less capital equipment; and ease to integrate with the downstream final xenon refinery. For example, the ability to process a liquid feed stream negates the need for a vaporizer to convert the liquid to gas. The ability to use an argon purge gas or released xenon product or pure xenon product means higher concentration xenon in the desorbed product for less separation work in the final xenon refinery. The lack of hydrocarbons in the product also simplifies the downstream processing which avoids the need for additional capital equipment, such as a catox and downstream pre-purifier.

In one embodiment, the invention relates to an adsorption process for deep rejection of hydrocarbons to 50 ppm or less in the product and recovery of xenon at levels ≥20%, in another embodiment ≥40%, in another embodiment ≥60% and in yet another embodiment ≥80% by volume concentration from a cryogenic oxygen fluid feed stream comprising at least ppm levels of xenon and hydrocarbon, is described. Other species, including carbon dioxide, nitrous oxide, and krypton may also be present in the feed stream. An example of a suitable fluid stream is as follows:

Xe 1-2000 ppm
Kr 10-20000 ppm
Hydrocarbons (as methane) 500-8000 ppm
$N_2O$ 0-200 ppm
$CO_2$ 0-100 ppm
ppm amounts of other atmospheric gases including $N_2$ and Ar
Balance $O_2$ The above oxygen rich stream is preferably at saturated or subcooled liquid phase at certain cryogenic temperatures and pressures. If components, which are more strongly adsorbed than Xe are present in the feed, such as $CO_2$ and $N_2O$, it is preferred that these species are substantially fully removed upfront by use of a gel trap, guard bed and/or layer of adsorbent within the main adsorption vessel which houses the adsorbent for Xe recovery. A suitable adsorbent for removal of these strongly adsorbing species is a silica gel or 4A type zeolite. It is preferable that the silica gel is shaped into a form compatible with a packed bed adsorption process, such as granular, or beaded. It is further preferred that the average particle size of the shaped material is at least 0.5 mm and not more than about 5 mm. The adsorbent for Xe recovery is preferably an Ag exchanged zeolite and most preferably an AgX zeolite, wherein the degree of Ag exchange is at least 80% and most preferably at least 90% on an equivalents basis. The AgX zeolite is also advantageously deployed as shaped particles, wherein beads, extrudates or granular materials may be used. The average particle size is also advantageously at least 0.5 mm and not more than about 5 mm.

A phase separator with pressure and temperature control was used in this adsorptive xenon enrichment system upstream of the adsorptive xenon bed. Before contacting the adsorptive xenon enrichment bed, the cryogenic liquid oxygen containing rare gases fluid stream can be partially vaporized through heat integration to increase the xenon concentration in the liquid phase by at least 10%. The vaporized gas phase will be recovered in the upstream process and the enriched xenon in liquid phase will be sent to the adsorbent bed for further concentrating. The phase separator will also ensure single liquid phase stream of the cryogenic liquid oxygen containing rare gases flowing through the adsorptive xenon enrichment bed to avoid any potential two phase flow maldistribution in the packed adsorbent bed. Table 1 provided a process simulation results with the valid property package to show what happens with the rare gases and hydrocarbons at 50% vapor generated.

TABLE 1

Components concentration change before and after the vaporization in phase separator

| | Components Mole Fraction in Streams (%) | |
| --- | --- | --- |
| | Crude cryogenic liquid feed | Liquid out of phase separator |
| Oxygen | 0.997453990 | 0.996566144 |
| Krypton | 0.001351005 | 0.002279800 |
| Xenon | 0.000129501 | 0.000252912 |
| Methane | 0.000477002 | 0.000681168 |

Results in Table 1 illustrate that the vaporization process could pre-enrich the rare gas in the crude oxygen containing liquid phase. With 50% vaporization, the xenon concentration could increase from 129.5 ppm to 252.9 ppm with 95% concentration increase. This increase of xenon concentration in the crude feed will improve xenon loading capacity on the adsorbent based on fundamental adsorption principle, which will ultimately reduce the adsorbent needed for the same feed therefore reduce capital of the overall system.

The released xenon from the adsorbent bed during the desorption could be sent to the downstream packaging system including optional buffer tank, compressor, and control system for storing the enriched xenon product and shipping to off-site refinery plant for pure xenon product. A process flow diagram is shown in FIG. 1.

Adsorption Process Description: Xenon Recovery Adsorption Bed

1. Stripping step (feed): The adsorbent bed containing an adsorbent selective for Xe which has been pre-cooled with a cryogenic oxygen fluid to a cryogenic temperature that is either equal or lower than the feed stream ($\leq 120K$). A feed stream in cryogenic liquid phase is provided at a pressure of above 1 psig containing at least ppm levels of Xe and hydrocarbons in an oxygen matrix. The adsorbent which is selective for Xe, gradually saturates with Xe as the flow of the feed stream is continued. The feed step is intentionally continued until the Xe concentration at the outlet of the bed is at least 90%, in another embodiment at least 95% of the Xe concentration at the inlet of the bed. At this point, the feed flow is ended.
2. Drain step: Once the criterion for ending Step 1 of having a Xe concentration at the outlet of the bed of at least 90% of the Xe concentration at the inlet of the bed is achieved, the feed to the bed is terminated and liquid residuals left in the bed are drained out from the adsorbent bed with gravity to eliminate unadsorbed impurities in the void space of the adsorptive system. Once the pressure inside the adsorbent bed reaches closer to the ambient (or downstream system pressure, where the drain is collected), the gravity drain will be stopped. The drain from the adsorbent bed can be either recycled back to the upstream system for saving xenon recovery or vaporize and vent to safe place.
3. Optional Oxygen purge step. Alternatively, a liquid oxygen or cold gas oxygen ($\leq 160K$) purge can be applied here to purge out any residues left inside the non-selective void space of the adsorbent vessel especially hydrocarbons. The purpose of using an $O_2$ purge is to save argon gas usage.
4. Argon purge and Displacement Step: Once the criterion for ending Step 2 of gravity drain is achieved, the bed is purged with argon at $\leq 160K$ to further remove hydrocarbons, any Xe left in the non-selective voids present in the adsorbent bed for recycle, and to displace oxygen co-adsorbed in the adsorbent during the stripping step. At the end of this step, the oxygen left in the adsorbent when desorbed in the later step will not be higher than 23.5% by volume, in another embodiment, no higher than 10% by volume, and in another embodiment, no higher than 1% by volume. Additionally, the hydrocarbon levels at the outlet of the adsorbent bed are $\leq 50$ ppm, in another embodiment $\leq 10$ ppm and in still another embodiment $\leq 1$ ppm. Alternatively, product xenon mixture or pure xenon can be introduced here to purge the bed at $\leq 160K$ to further remove hydrocarbons left in the non-selective voids present in the adsorbent bed and displace oxygen co-adsorbed in the adsorbent during the stripping step. If liquid or gas oxygen purge is applied, the hydrocarbon levels at the outlet of the adsorbent bed are $\leq 50$ ppm, in another embodiment $\leq 10$ ppm and in still another embodiment $\leq 1$ ppm is met first. And then cold gas argon ($\leq 160$ K) or product xenon mixture or pure xenon can be introduced here to purge the bed at $\leq 160K$ to further remove hydrocarbons left in the non-selective voids present in the adsorbent bed and displace oxygen co-adsorbed in the adsorbent during the stripping step.
5. Regeneration and Xe recovery: At this point, the temperature of the adsorbent bed is increased from cryogenic temperatures to above 400K in order to recover a Xe product at $\geq 20\%$ by volume concentration, in another embodiment 40% by volume, and in yet another embodiment 90% by volume and containing at most 50 ppm hydrocarbon, measured as methane equivalent and at most 23.5% oxygen. The temperature is raised by heating the adsorbent indirectly through outside of the adsorbent vessel wall without using any hot purge gas to the inner adsorbent bed. The desorbed xenon will be released naturally from the adsorbent bed to xenon collection tank before moving to downstream processing. Alternatively, the temperature can also be raised by heating the adsorbent directly through heating device embedded inside the adsorbent bed, or indirectly through conduction methods, or heat tape, or other related process heating step. Alternatively, at the end of the heating step, a controlled argon purge gas can be introduced to sweep out any xenon molecules left inside the inner adsorbent vessel to maximize xenon recovery. In another embodiment, instead of providing heat to warm up the adsorbent bed to release the xenon product, vacuum can be also applied on one end of the adsorbent bed to suck out the xenon product from the adsorbent. The outlet of the vacuum device can be ties in to the downstream collecting/packing system with buffer tank and compressor as well.
6. Bed Cooling: After the temperature of the adsorbent bed reaches above 400K and the Xe product has been recovered, the bed must be cooled again to cryogenic temperatures. This is accomplished by stopping the heating supplied to the adsorbent bed and contacting the adsorbent bed directly with ambient temperature oxygen or indirectly with ambient air in the vessel jacket and then a cryogenic oxygen fluid to cool the bed to cryogenic temperature that is either equal or lower than the feed stream ($\leq 120K$).

Steps 1-6 can be operated cyclically. It is also possible to operate this adsorption process using one or more adsorbent beds. If single bed is used, an optional buffer tank could be used to temporarily store the feed stream during the adsorbent bed is offline for regeneration to enable a continuous process. If two adsorption beds are used, it is advantageous to operate the process wherein these two adsorbent beds are out of phase with one another, such that while bed 1 is on Step 1, bed 2 is undergoing Steps 2, 3, 4, 5 and 6. It is particularly advantageous to operate the 2-bed process to have bed 2 regenerated, following Steps 2, 3, 4, 5 and 6, before bed 1 has registered any Xe breakthrough. In this way, for a portion of Step 1, both beds 1 and 2 can be operated in series to enable the outlet Xe concentration from bed 1 to be $\geq 90\%$ and preferably $\geq 95\%$ of the inlet concentration and at the same time, increase the overall Xe recovery, since any Xe which is not fully captured by bed 1 can be captured by bed 2 and vice versa, when these beds are connected in series for a portion of the feed step.

Downstream Xenon Collection and Packaging Process Description:

The released xenon from the adsorbent bed was collected first in a buffer tank sized and controlled to stabilize the flowrate, pressure and composition and then this stream is sent to a compressor for compressing (≥2000 psig) and packaging the xenon enriched stream to cylinders, which can be shipped regularly to off-site xenon refinery units for producing pure xenon product. Alternatively, a xenon refinery plant can also be built to take the released xenon enriched stream directly from the adsorptive system and produce pure xenon onsite.

The invention will now be illustrated by the following non-limiting example, which illustrates xenon recovery from a feed streams at cryogenic liquid phase, and shows how argon gas can be used to displace $O_2$ co-adsorbed on the adsorbent at cryogenic temperature.

Example 1: Xe Recovery from Feed Liquid Containing 70 ppm Xe, 530 ppm Kr, 500 ppm $CH_4$, Balance $O_2$ 6.5 g of AgLSX beads having an average particle size of 1.5 mm (99% exchanged with Ag, on an equivalents basis, balance Na) were packed into a stainless steel adsorption bed (0.62" ID×4.0" height) equipped with an inlet and an outlet, as well as a thermocouple placed near the midpoint of the adsorbent bed for temperature measurements. This adsorbent bed was placed inside a liquid nitrogen cooled cryostat from Oxford Instruments, wherein the temperature of the adsorbent bed could be controlled to within ±1° K throughout the temperature range 77-300° K. The inlet of the adsorbent bed was connected to a manifold enabling either the feed containing 70 ppm Xe, 530 ppm Kr, 500 ppm $CH_4$, and balance $O_2$ to be flowed through the adsorbent bed or UHP grade Ar employed as the purge fluid to be flowed through the adsorbent bed. The pressure in this test apparatus was controlled using a back pressure regulator placed after the adsorbent bed on the outlet line. Unless otherwise specified the pressure during the stripping step was 100 psig and 50 psig during the purge steps and temperature swing bed regeneration. An Omnistar residual gas analyzer (RGA) with 200 atomic mass units range from Pfeifer Inc. was employed to measure the composition of the gas exiting the bed with a time resolution of about 0.1 minutes per data point. This test apparatus was completed by valves enabling the feed and/or purge fluids to be passed through the adsorbent bed in either co-current or counter-current flow paths. A bypass loop was also included to enable the bed to be bypassed to enable the feed composition to be measured at any time, as well as to facilitate the calibration of the RGA. This apparatus was employed to measure breakthrough curves for all non-$O_2$ components, including Xe, Kr, and $CH_4$ as well desorption concentration profiles for all non-Ar components. The purpose of the desorption curves was to detect whether the $O_2$ is displace with Ar at cryogenic temperature and also to better understand xenon release from the adsorbent.

Figure 4:
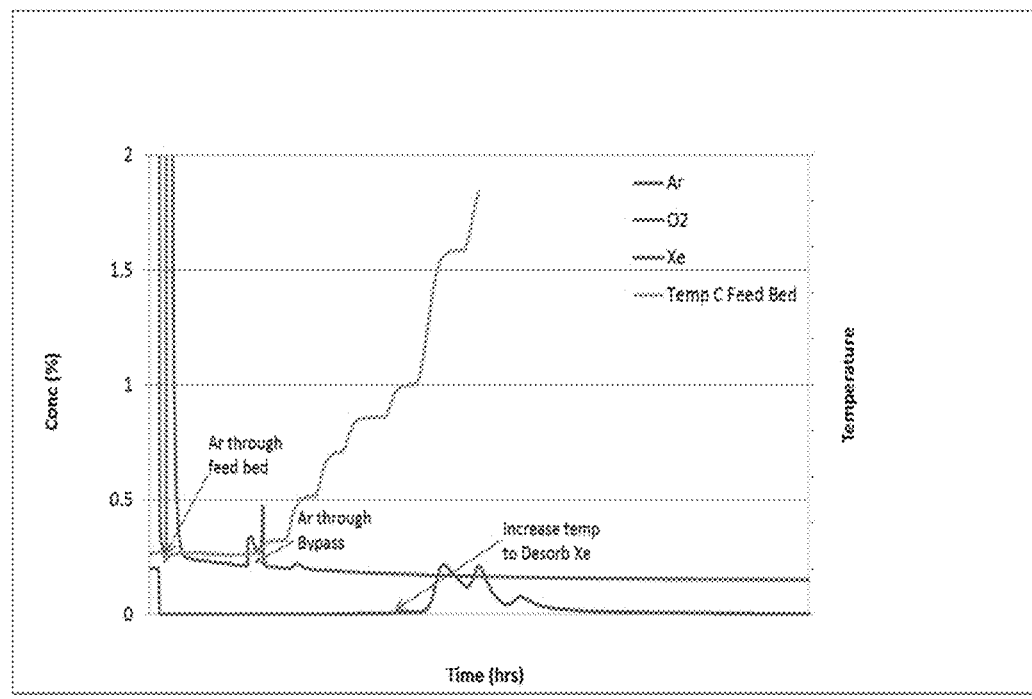
FIG. 4 shows the concentration profiles for $O_2$ and Xe during desorption on AgLSX.

The adsorbent bed temperature was cooled to 100° K and pressurized to 100 psig using the UHP $O_2$ at a gas equivalent flow rate of 1.25 SLPM. When the bed was at temperature, the feed mix containing Xe, Kr and $CH_4$ was contacted with the adsorbent bed at the same pressure, temperature and flow conditions. After a short time period, the RGA detected an initial breakthrough of Kr. From these data it is clear that the Kr breakthrough occurred first, followed by $CH_4$ shortly after. By contrast, the Xe took over much longer time to breakthrough from the adsorbent. At this point, the feed flow was ended and a flow of UHP Ar at 1.25 SLPM was initiated to clean the non-selective voids in the bed and piping of Xe and $CH_4$ feed components and displace $O_2$ co-adsorbed on the adsorbent. The adsorbent bed temperature was maintained at the same cryogenic temperature as during the stripping step. As shown in FIG. 4, as Ar was introduced into the adsorbent bed, $O_2$ started to come out from the adsorbent fairly quick even at cryogenic temperature and no Xe desorption was detected. These results proved that Ar can be used to displace $O_2$ from the AgLSX adsorbent without desorbing Xe from the adsorbent. Xenon release from the AgLSX will not happen until the adsorbent bed is warmed up to much higher temperature when the bed is clear of $O_2$. According to results in FIG. 4, before the temperature was raised up in the adsorbent bed, the $O_2$ concentration was around 0.2% by volume balanced with Ar which enables a safe environment for heating the adsorbent vessel to 400 K or above for Xe release.

We claim:

1. An adsorption process for the recovery of xenon from a liquid or gas cryogenic feed stream comprising xenon and at least one other adsorbable component which comprises:
   i. feeding the feed stream at cryogenic temperatures into the inlet of an adsorption vessel containing an adsorbent bed loaded with at least one adsorbent selective for xenon, wherein said adsorbent bed has an inlet and an outlet,
   ii. maintaining the feed to said adsorbent bed until the xenon product concentration at the outlet of said bed is greater than or equal to 90% of the xenon feed concentration at the inlet to said adsorbent bed,
   iii. ending the feed to the adsorption bed,
   iv. draining said bed if the feed stream is a liquid or depressurizing said bed if the feed stream is a gas,
   v. purging the adsorbent bed with a purge gas at a temperature effective to desorb any oxygen co-adsorbed on the adsorbent in said adsorbent bed and to remove said at least one other adsorbable component from the non-selective void spaces of the bed,
   vi. increasing the temperature of said adsorbent bed to a temperature effective to desorb substantially all xenon from the adsorbent in said adsorbent bed, followed by purging the heated adsorbent bed to sweep out any remaining xenon held on the adsorbent and/or left in the void space of the vessel,
   vii. recovering the xenon product desorbed from said adsorbent bed,
   viii. cooling said adsorbent bed to cryogenic temperatures, and repeating steps i.-viii. in a cyclic manner.

2. The process of claim 1 wherein said purge gas is selected from argon, helium, or krypton or any combination thereof.

3. The process of claim 1 wherein the temperature of the bed is increased by
   i. heating the bed directly with an embedded heating device inside the adsorbent bed,
   ii. heating the bed by applying heated product xenon to purge the adsorbent bed for regeneration, or
   iii. heating the bed with an indirect heating method.

4. The process of claim 3 wherein the adsorbent vessel is jacketed and an indirect heating method is utilized.

5. The process of claim 1 wherein vacuum is provided in step vi to assist in recovering the xenon desorbed from the adsorbent, wherein said vacuum is generated by a sealed vacuum generating device at <760 torr.

6. The process of claim 5 wherein said vacuum is at least ≤100 torr.

7. The process of claim 1 wherein said at least one other adsorbable component in said cryogenic feed stream comprises hydrocarbon, krypton or combinations thereof.

8. The process of claim 7 wherein said hydrocarbon is methane, ethane, ethylene, propane or combinations thereof.

9. The process of claim 1 wherein said feed stream comprises from about 1-2000 ppm xenon, 10-20000 ppm Kr, 500-8000 ppm hydrocarbons, 0-200 ppm $N_2O$, 0-100 ppm $CO_2$, 0-1200 ppm of Ar, ppm amounts of $N_2$ and other atmospheric gases, balance $O_2$.

10. The process of claim 1 wherein said adsorbent bed of step i. is pre-cooled to a temperature of ≤120K.

11. The process of claim 1 wherein said purge step is continued until the hydrocarbons level at the outlet of said adsorbent bed is ≤50 ppm.

12. The process of claim 11 wherein said purge step is continued until the hydrocarbons level at the outlet of said adsorbent bed is ≤10 ppm.

13. The process of claim 1 wherein in step iv., the temperature of the adsorbent bed is increased from cryogenic temperatures to at least 250 K in order to recover a xenon product at a concentration of ≥20% xenon.

14. The process of claim 1 wherein in step viii., the adsorbent bed is cooled to a temperature of ≤120 K.

15. The process of claim 1 wherein said adsorbent bed is maintained on feed until the xenon product concentration at the outlet of said bed is greater than or equal to 95% of the xenon feed concentration at the inlet to said adsorbent bed.

16. The process of claim 1 comprising at least two adsorbent beds wherein said adsorbent beds are out of phase with each other and wherein said two adsorbent beds are connected in series for a portion of the feed step.

17. The process of claim 1 wherein said xenon selective adsorbent is selected from a silver ion exchanged zeolite of type X, wherein the ion exchange level is at least 80% Ag on an equivalents basis, or a silver ion exchanged zeolite of type X, wherein the ion exchange level is at least 90% Ag on an equivalents basis.

18. The process of claim 1 wherein the recovered xenon product from step vii is at least 10% by volume concentration.

19. The process of claim 18 wherein the recovered xenon product is at least 40% by volume concentration.

20. The process of claim 18 wherein the released xenon product is ≥90% by volume concentration.

21. The process of claim 1 wherein prior to purging the bed according to step v., liquid or gaseous oxygen is introduced to the bed in order to purge any remaining hydrocarbon left in said bed.

22. The process of claim 2 wherein the adsorbent bed is purged with a gaseous purge gas at a cryogenic temperature of ≤160 K.

23. The process of claim 1 wherein the purge sweep of step vi is not commenced until the adsorbent bed temperature reaches ≥400 K.

24. The process of claim 1 wherein the purge gas of step vi is selected from helium, krypton, oxygen, nitrogen, dry air or a combination of two or more of said purge gases.

* * * * *